(12) United States Patent
Josserand et al.

(10) Patent No.: US 8,185,246 B2
(45) Date of Patent: May 22, 2012

(54) AIR-CONDITIONING CONTROL ALGORITHM EMPLOYING AIR AND FLUID INPUTS

(75) Inventors: Olivier Josserand, La Boisse (FR); Eric Royet, Thil (FR); Patrick Renault, Lyons (FR); Richard Kolk, Louisville, KY (US)

(73) Assignee: Carrier Corporation, Farmington, CT (US)

( * ) Notice: Subject to any disclaimer, the term of this patent is extended or adjusted under 35 U.S.C. 154(b) by 206 days.

(21) Appl. No.: 12/521,320

(22) PCT Filed: Dec. 29, 2006

(86) PCT No.: PCT/US2006/049629
§ 371 (c)(1),
(2), (4) Date: Dec. 14, 2009

(87) PCT Pub. No.: WO2008/085153
PCT Pub. Date: Jul. 17, 2008

(65) Prior Publication Data
US 2010/0100246 A1    Apr. 22, 2010

(51) Int. Cl.
*G05B 21/00* (2006.01)
*G05B 13/00* (2006.01)
*G05B 15/00* (2006.01)
*G01M 1/38* (2006.01)
*G05D 23/32* (2006.01)
*G05D 23/00* (2006.01)
*F24F 11/053* (2006.01)
*F24D 19/10* (2006.01)
*F25B 49/00* (2006.01)
*F25B 29/00* (2006.01)
*G01K 13/00* (2006.01)
*F25D 17/04* (2006.01)

(52) U.S. Cl. ....... 700/278; 236/1 B; 236/1 C; 236/91 D; 236/91 E; 62/126; 62/129; 62/157; 62/159; 62/176.6; 165/289; 165/291; 165/293

(58) Field of Classification Search .......... 700/276–278; 62/98, 99, 126, 15, 176.4–176.6, 155–157, 62/159, 129, 130; 165/287–289, 291–293; 236/1 B, 1 C, 91 R, 91 D, 91 E; 237/2 R, 237/8 R, 8 A
See application file for complete search history.

(56) References Cited

U.S. PATENT DOCUMENTS
4,320,870 A * 3/1982 Manor ........................... 236/37
(Continued)

FOREIGN PATENT DOCUMENTS
JP    2743595 A    9/1992
(Continued)

OTHER PUBLICATIONS
International Search Report and Written Opinion mailed Sep. 16, 2008 (10 pgs.).

*Primary Examiner* — Crystal J Barnes-Bullock
(74) *Attorney, Agent, or Firm* — Cantor Colburn LLP

(57) ABSTRACT

Sensing, actuation of apparatus, and a control algorithm for use in automatically controlling an air-conditioning system by sensing multiple conditions and responding by actuating the mechanical components of the air-conditioning system to optimize the temperature of the coolant fluid, provide improved zone temperature control, provide status of system components, and provide an alert if there is overheating of a supply side system mechanical component.

13 Claims, 4 Drawing Sheets

U.S. PATENT DOCUMENTS

| | | |
|---|---|---|
| 4,376,510 A | 3/1983 | Allard |
| 4,487,028 A * | 12/1984 | Foye .................................. 62/115 |
| 5,138,845 A * | 8/1992 | Mannion et al. ................... 62/99 |
| 5,276,630 A | 1/1994 | Baldwin et al. |
| 6,176,095 B1 * | 1/2001 | Porter .............................. 62/126 |
| 6,219,590 B1 | 4/2001 | Bernaden, III et al. |
| 6,269,650 B1 * | 8/2001 | Shaw ............................ 62/176.6 |
| 6,352,106 B1 * | 3/2002 | Hartman ........................ 165/293 |
| 6,634,422 B2 | 10/2003 | Rayburn et al. |
| 6,981,385 B2 * | 1/2006 | Arshansky et al. .............. 62/155 |
| 7,819,334 B2 * | 10/2010 | Pouchak et al. .............. 237/8 R |
| 7,857,233 B2 * | 12/2010 | Trantham ...................... 236/1 C |
| RE42,195 E * | 3/2011 | Bash et al. .................... 700/276 |
| 8,019,477 B2 * | 9/2011 | Bash et al. .................... 700/276 |
| 2004/0093881 A1 | 5/2004 | Kim |
| 2004/0148950 A1 | 8/2004 | Catzel |
| 2005/0023363 A1 * | 2/2005 | Sharma et al. ............... 236/49.3 |
| 2005/0091021 A1 * | 4/2005 | Gupta et al. .................... 703/12 |
| 2006/0042278 A1 * | 3/2006 | Ludwig et al. ................. 62/130 |
| 2008/0006044 A1 * | 1/2008 | Tan ................................ 62/197 |

FOREIGN PATENT DOCUMENTS

| | | |
|---|---|---|
| JP | 08-094151 A | 4/1996 |
| JP | 2002-267233 A | 9/2002 |
| WO | WO-02/066902 A1 | 8/2002 |

* cited by examiner

AIR-CONDITIONING CONTROL ALGORITHM EMPLOYING AIR AND FLUID INPUTS

CROSS REFERENCE TO RELATED APPLICATIONS

This application is related to patent application identified by both of which are subject to assignment to Carrier Corporation, and each of which is being filed on even date herewith.

FIELD OF THE INVENTION

The present invention relates to the field of temperature control systems, and in particular, to a control algorithm for use in automatically controlling an air-conditioning system by sensing multiple conditions and responding by actuating the mechanical components of the air-conditioning system.

BACKGROUND OF THE INVENTION

Many air conditioning zone control systems include a single sensor that monitors the temperature of the ambient air or the temperature of the air returning from the zone whose temperature is being controlled. This sensor provides feedback to an air-conditioning system controller in order for the controller to adjust various air-conditioning components such as supply air fans, coil coolant fluid proportional valves (cooling or heating mode), and electric heaters, if any, to attempt to maintain a temperature setpoint in the zone.

A controller using a control algorithm that only references a zone's ambient or return air temperature against a user entered setpoint can yield large temperature fluctuations in the zone because, for example, the supply air is of a much lower temperature than the zone's temperature. When this supply air is delivered to the zone, it causes a large temperature drop below the setpoint and the controller must affect an immediate adjustment in the opposite direction to provide warmer air to the zone.

This cycling is undesirable because it causes the controller to frequently adjust the system components in an effort to achieve the setpoint in the zone, and as a result, it merely increases equipment wear and causes periodic temperature fluctuations above and below the setpoint in the zone.

Certain algorithms exist to minimize the aforementioned cycling using only the ambient temperature in the zone or the return air sensor, but without additional sensors, they are not capable of providing for optimization of the temperature fluctuations in the coolant fluid, detecting air-conditioning system mechanical component failures, providing supply end equipment overheating alerts to a system user or building management system, or providing smart temperature controls for an air conditioned zone.

SUMMARY OF THE INVENTION

A control algorithm for implementation in a zone air-conditioning controller is provided wherein multiple sensors connected to the controller provide representative signals that the controller selectively employs through the control algorithm to provide, based on numerous user programmable parameter inputs, command signals to to actuators of mechanical components of the system.

In one embodiment, the control algorithm can use the supply coolant fluid and return coolant fluid temperature signals to control actuators in the system to optimize the delta temperature between the inlet and outlet of the coolant fluid in the temperature adjusting coil while maintaining the desired zone temperature when the system is in operation.

In another embodiment, the control algorithm can use the supply air temperature signal to selectively provide information that a system component in the system has failed.

In still another embodiment, the control algorithm can use the supply air temperature signal to selectively provide for a safety warning of hazardous equipment failure.

In yet another embodiment, the control algorithm can use the supply air temperature input and the return air temperature input to enable a smart temperature control system to create desirable effects in the zone controlled by the controller.

BRIEF DESCRIPTION OF THE DRAWINGS

For a further understanding of these and other objects of the invention, reference will be made to the following detailed description of the invention which is to be read in connection with the accompanying drawing, where.

DETAILED DESCRIPTION

Figure 1:
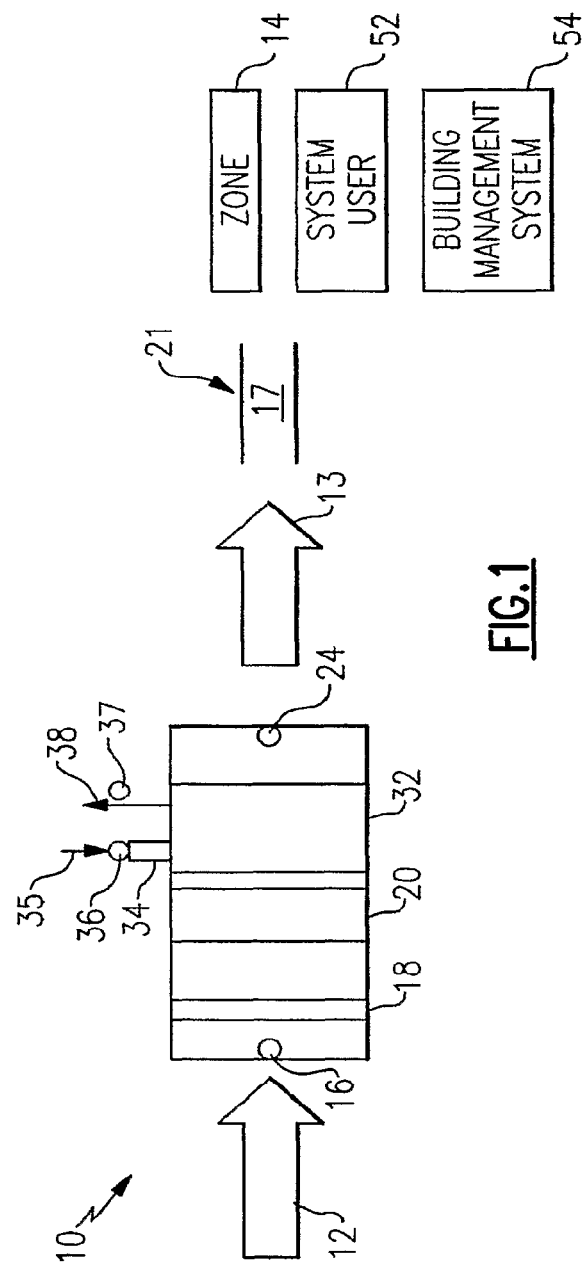
FIG. 1 diagrammatically depicts a zone air-conditioning system and its component parts.

Referring initially to FIG. 1, there is illustrated a diagrammatical depiction of a zone air-conditioning system generally referenced at 10, that illustrates a direction of air flow coming into the system 12, from the air-conditioned zone 14 and a direction of conditioned air flow exiting the system 13. Entrance of the air flow from the zone 14, passes over a return air temperature sensor 16, then through a supply side filter 18, then through at least one supply side air fan 20, a supply side air temperature adjusting coil 32, and finally over a supply air temperature sensor 24. The conditioned air is then supplied to the zone 14. A supply side proportional coolant fluid flow valve 34, is disposed in the piping that the supplies the supply coolant fluid 35, to the supply side of the air temperature adjusting coil 32. The temperature of the supply coolant fluid 35, is sensed by a supply coolant fluid temperature sensor 36, if present, or broadcast by a building monitoring system. The temperature of the return coolant fluid 38 from the air temperature adjusting coil 32, is monitored by a return coolant fluid temperature sensor 37.

Figure 2:
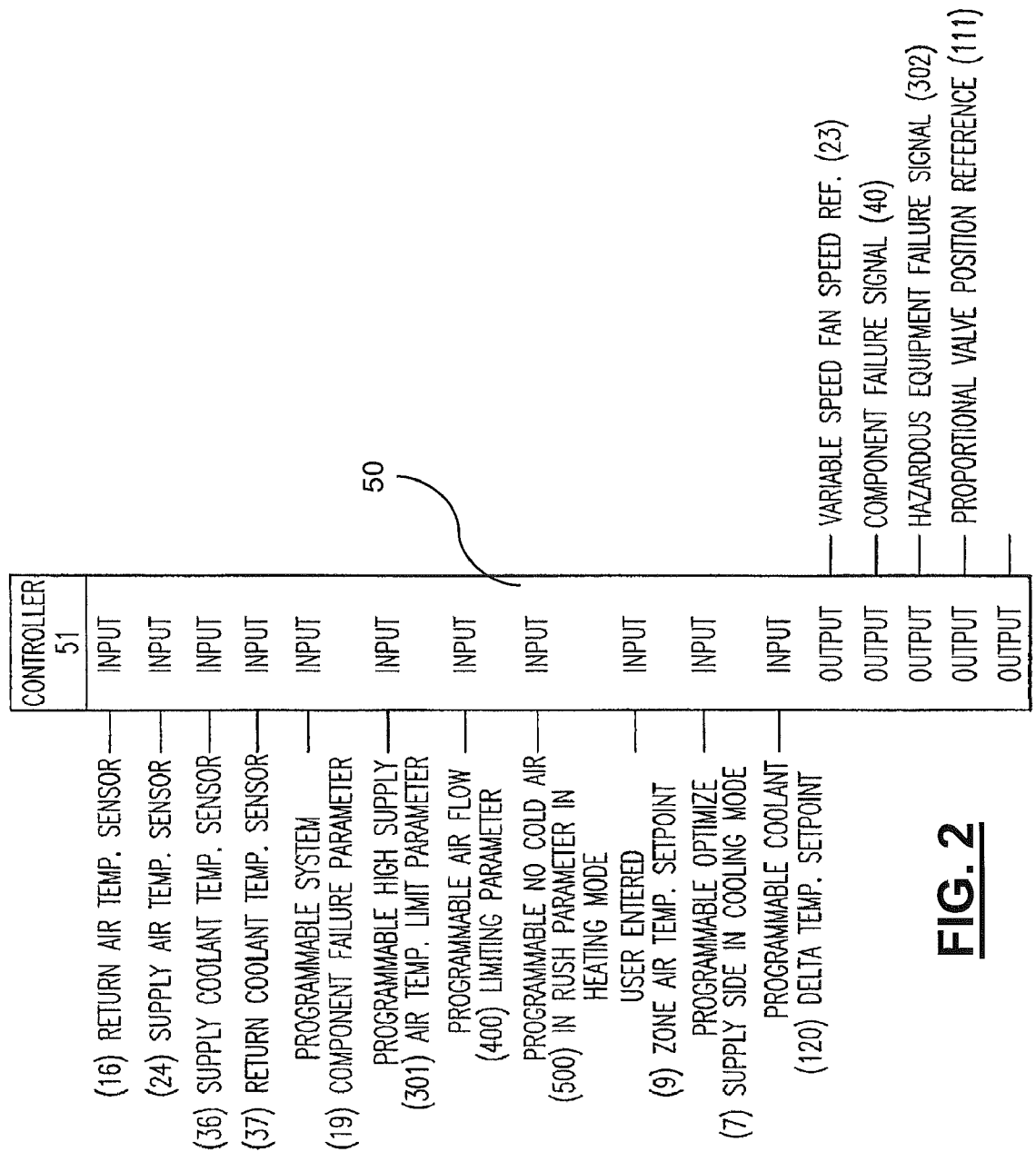
FIG. 2 displays numerous inputs and outputs connected to the air-conditioning system zone controller to be used by the new algorithm.

Turning now to FIG. 2, some inputs and outputs to air-conditioning system controller 51, are shown that are used by the control algorithm 50, running therein. An example of an input and output includes programmable air flow limiting parameter 400 and variable speed fan speed reference 23 respectively. The controller 51, contains a microprocessor having a clock speed of at least 16 MHz, internal RAM memory of at least 3.84 Kbytes, internal FLASH memory of at least 128 Kbytes, internal E.sup.2 memory of at least 1

Kbyte, a built in A/D converter of at least 10 bits with a 1 LSB error, and a watchdog that is on the chip hardware.

In one embodiment, the control algorithm 50, primarily controls the temperature of the zone 14, and secondarily strives to optimize the delta temperature of the coolant fluids 35, 38, of the air-conditioning system 10, to a temperature of about 5-6 degrees Fahrenheit. Delta temperature is defined as the difference between the supply coolant fluid 35, temperature as sensed by the supply coolant fluid temperature sensor 35, if present, or as a value broadcast to the controller 51, by a building management system 54, and the return coolant fluid 38, temperature as sensed by a return coolant fluid temperature sensor 37.

Figure 3:
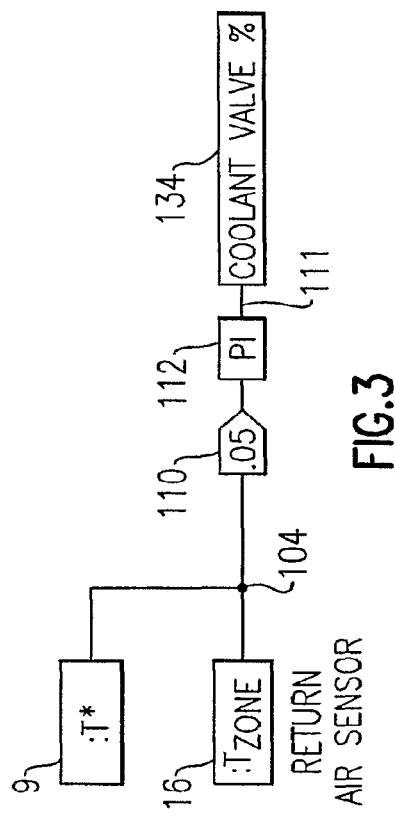
FIG. 3 schematically depicts the prior art control of a proportional coolant fluid flow valve of an air-conditioning system using only a return air sensor and a zone setpoint.

Referring now to FIG. 3, a schematic depiction of the prior art relating to proportional coolant fluid flow valve 34, is shown wherein the proportional position reference 134, is determined solely by the zone 14, ambient air temperature or the return air temperature sensor 16. As mentioned above, this system has many undesirable effects relating to zone temperature fluctuations and equipment wear. It should be noted that this prior art is included as a portion of the present invention's proportional coolant fluid flow valve's 34, control algorithm 50.

Figure 4:
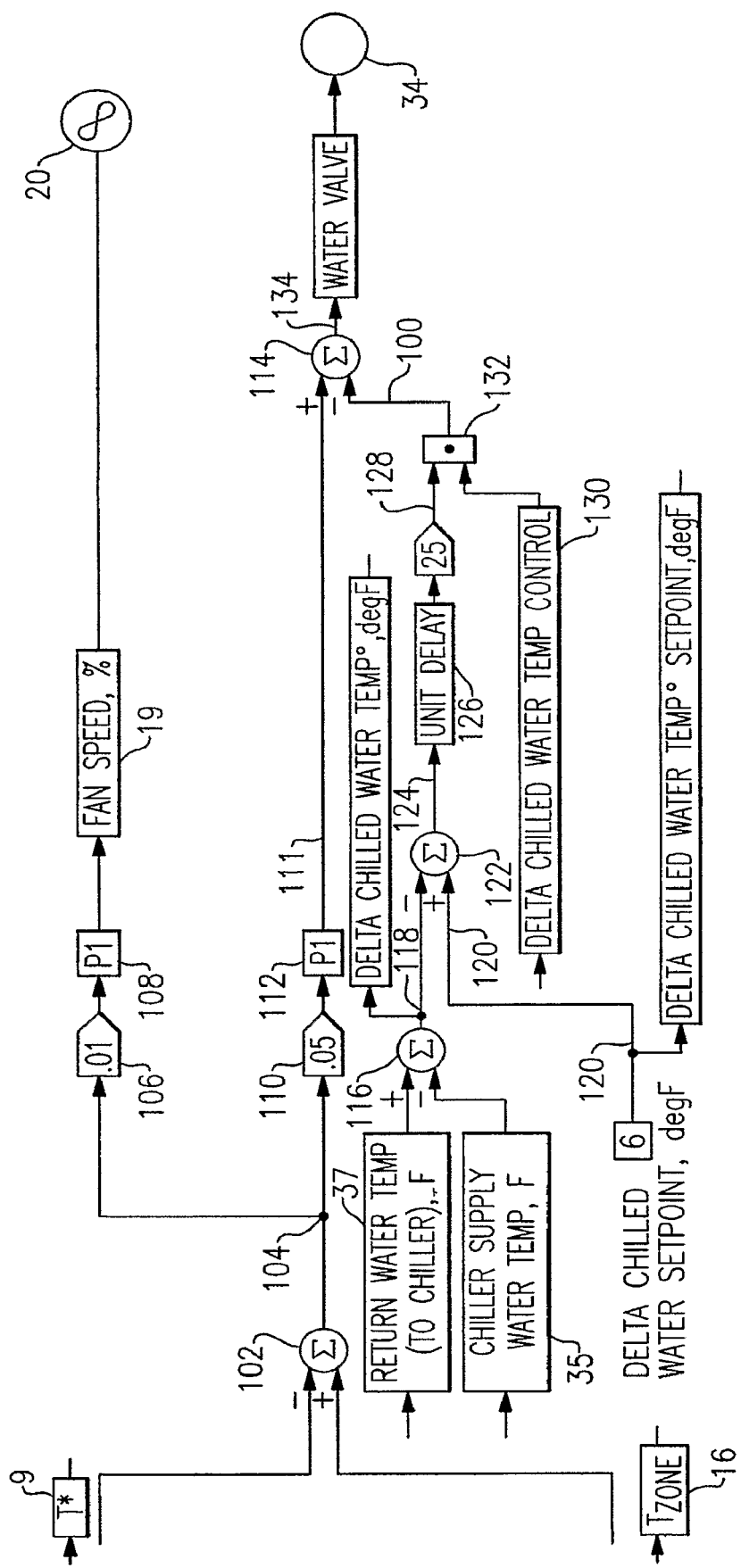
FIG. 4 schematically depicts a coolant fluid delta temperature controlling embodiment of the new control algorithm.

Referring now to FIG. 4, an embodiment of the proportional coolant fluid flow valve 34, system control algorithm 50, is shown. The upper half of the schematic depicts a standard control loop wherein the user entered zone setpoint 9, input by a thermostatic device or programmed by a system user, and the return air temperature sensor 16, input values are combined in symbolic sigma block 102, to provide zone setpoint error point signal 104, which is conditioned through an adjustable fan gain block 106, and an adjustable fan PI block 108, to yield a fan speed reference signal 19, to at least one variable speed fan 20. A symbolic sigma block is defined as a graphical depiction of a mathematical summation of the values entering into it with the resulting value exiting it. Zone setpoint error point signal 104, is also conditioned through an adjustable proportional coolant fluid flow valve gain block 110, and an adjustable proportional coolant fluid flow valve PI Block 112, to yield a proportional coolant fluid flow valve positioning reference signal 111, that is input to symbolic sigma block 114, whose output is the position reference signal 134, to proportional coolant fluid flow valve 34. It should be noted that FIG. 4 depicts the coolant fluid to be water, however, those skilled in the art will appreciate that other refrigerants well known in the art could be used.

Without the new algorithm, the bottom portion of the schematic, a zero value would come into symbolic sigma block 114, and yield the prior art calculation for positioning the proportional coolant fluid flow valve 34, and would suffer from the frequent adjustment of its position and the temperature of the supply coolant fluid 35, used to supply the air temperature adjusting coil 32. As noted above, this type of control scheme using only the zone air temperature setpoint 9, and the return air temperature sensor 16, input is undesirable because it only results in temperature fluctuations above and below the user entered zone air temperature setpoint 9, and increased supply side equipment wear.

To minimize this fluctuation, the new algorithm (the bottom portion of the schematic in FIG. 4) provides a dampening (transient response minimizing) proportional feedback loop that is implemented using the actual difference of the supply coolant fluid 35, and return coolant fluid 38, temperatures compared against a user selectable coolant fluid delta temperature setpoint parameter 120, which is optimally about 5-6 degrees Fahrenheit. The new proportional loop supplies the control algorithm 50, with the temperature of the supply coolant fluid 35, via the supply coolant fluid temperature sensor 36, or a value broadcast from a building management system, and the temperature of the return coolant fluid 38, via the return coolant fluid temperature sensor 37. The supply coolant 35, temperature is combined with the return coolant temperature 37, in symbolic sigma block 116, and yields a coolant fluid delta temperature signal 118, as the system 10, is operation.

This proportional coolant feedback delta temperature signal 118, is combined with the user entered coolant fluid delta temperature setpoint 120, in symbolic sigma block 122, which yields a coolant fluid delta temperature error 124. A unit delay block 126, and an adjustable gain block 128, condition the coolant fluid delta temperature error 124, which is combined in multiplication block 132, with a delta coolant temperature controller output 130, to create a coolant proportional control loop output signal 100. This coolant proportional control loop output signal 100, is negated and then combined with the return air controlled proportional valve position reference 111, in symbolic sigma block 114, to yield the proportional position reference 134, to the proportional coolant fluid flow valve 34.

The effect of utilizing this control algorithm 50, with the coolant fluids 35, 38, temperature feedback is to dampen the amplitude of the coolant fluids 35, 38, temperature fluctuations to a point that they are not as greatly affected by variations of the return air 12, to the air-conditioning system 10, and can strive to achieve the optimum temperature of about 5-6 degrees Fahrenheit.

Figure 5:
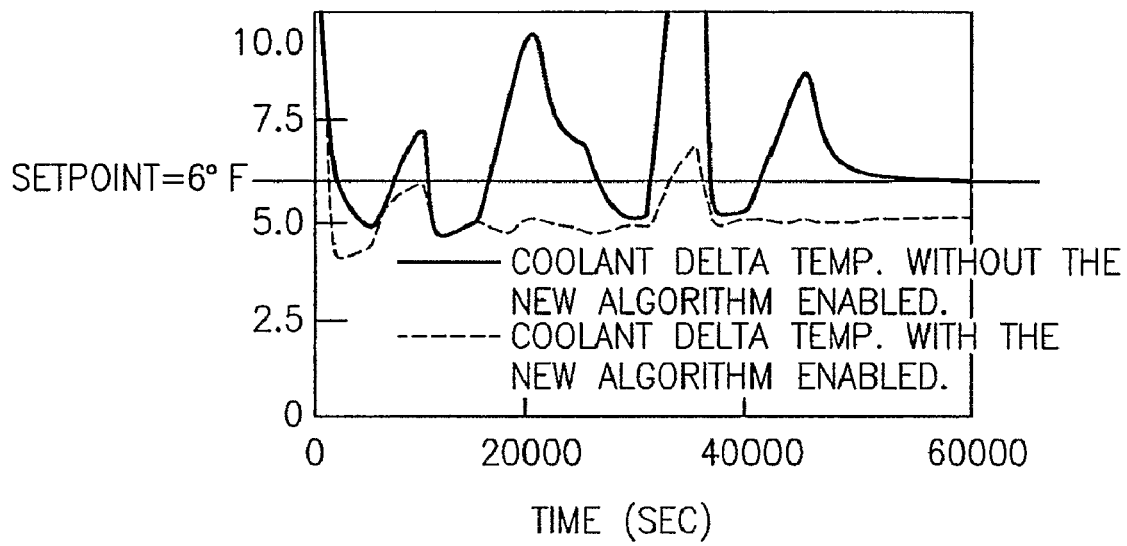
FIG. 5 shows, in the form of curves, the values of the setpoint and the delta temperature of the coolant fluid with and without the new algorithm active in the controller.

Referring now to FIG. 5, the aforementioned dampening of the coolant fluid temperature response to fluctuating readings from the return air sensor 16, and the effect of using the new control algorithm 50, are demonstrated in the form of response curves from a system running the exact same simulation. One simulation had the control algorithm 50, activated and the other did not.

The more active temperature signal trace depicts the erratic behavior of the coolant delta temperature signal 118, with the new control algorithm deactivated and the coolant temperature being controlled only by the return air temperature sensor 16, input compared to the user entered zone setpoint 9.

The more stable temperature signal trace depicts a more controlled behavior of the delta temperature signal 118, with the new control algorithm 50, activated using the return air temperature sensor 16, input, the supply air temperature sensor 24, input, the coolant fluid supply sensor 36, input, the coolant fluid return sensor 37, input, and the proportional coolant fluid flow valve 34, positioning reference output signal 111, in operation. As can be seen, the delta temperature response of the coolant fluids 35, 38, in relationship to the user entered coolant fluid delta temperature setpoint 120, in this case, 6 degrees Fahrenheit, is much closer because of the dampened response of the position reference signal 134, to proportional coolant fluid flow valve 34.

Figure 6:
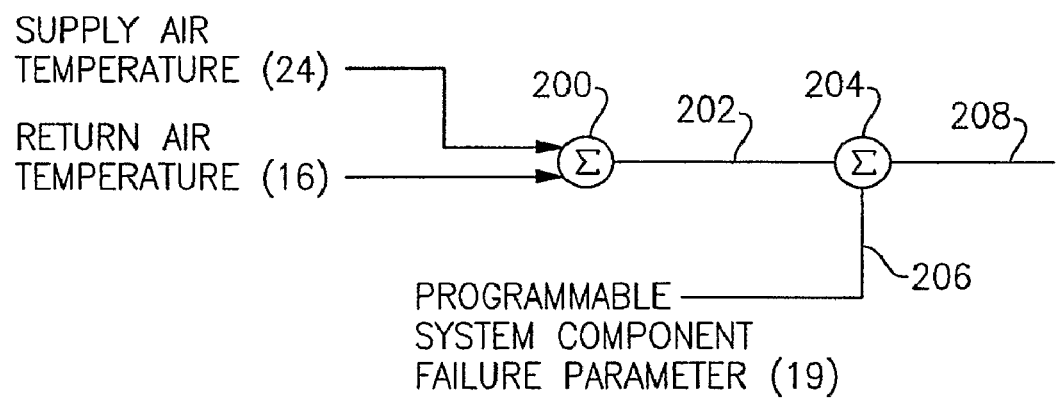
FIG. 6 schematically depicts a supply side equipment overheating and warning system embodiment of the new control algorithm.

Turning now to FIG. 6, in another embodiment, the air-conditioning system controller 51, can selectively provide information that a system component in the system has failed. Using inputs from the supply air temperature sensor 24, and the return air temperature sensor 16, and combining these values through symbolic sigma block 200, yields an air delta temperature signal 202, value that is combined with a user programmed system component failed parameter 19 through symbolic sigma block 204, to yield a system component status signal 208, that the control algorithm 50, can use to determine that the system is functioning abnormally and that there has been a component failure or significant decrease in a component's functionality. Upon this detection, the control algorithm 50, can send a component failure signal 40, to alert a system user 52, via a visual device or a building management system 54, to inform a proper individual of the probable malfunction.

In another embodiment, the control algorithm 50, selectively provides for a safety warning of a hazardous equipment failure. For example, if the supply air temperature sensor 24, detects a temperature input exceeding a programmable high supply air temperature limit parameter 301, the control algorithm 50, can send a hazardous condition signal 302, to alert a system user 52 by a visual device, or a building management system 54, to inform a proper individual of the probable malfunction, and automatically shut down the air-conditioning system 10.

In still another embodiment, the control algorithm 50, selectively enables smart temperature control of the air-conditioned zone 14. For example, using the supply air temperature sensor 24, input and the control algorithm 50, the "cold shower effect" in the heating mode can be avoided if a "no cold air inrush in heating mode" parameter 500, is programmed by the system user 52, to do so. The "cold shower effect" is realized when at least one of the supply air fans 20, is turned on at a high speed and pushes air that has been cooled 17, by remaining in the ductwork 21, between the air-conditioned zone 14, and the supply equipment. When this cooled air 17, is forced into the zone 14, at a high speed before any air-conditioned air is mixed with it, the result is air delivery that is cool at first and then warms up after the ductwork is purged of the cooled air 17.

The control algorithm 50, is adapted to reduce the variable speed fan reference signal 19, of at least one of the supply air fans 20, raise the temperature of the supply air flow through the use of the supply side air temperature adjusting coil 32, to slowly mix the cooler air already in the ductwork 21, with the higher temperature air flow exiting the system 13, and then deliver air to the zone 14, that is initially much closer to user entered air temperature setpoint 9.

Yet another example of smart temperature control using the supply air temperature sensor 24, input and the control algorithm 50, is to avoid potential condensation risks of supply side components in the cooling mode. If an "optimize supply side temperature in cooling mode" 7, parameter is programmed by the user to do so, the control algorithm 50, will use the detected supply air temperature sensor 24, input and raise the temperature of the supply side coolant fluid 35, to heat the supply side equipment as much as possible to avoid condensation risks without affecting the overall air-conditioning purpose of the system 10.

While the present invention has been particularly shown and described with reference to the preferred mode as illustrated in the drawing, it will be understood by one skilled in the art that various changes in detail may be effected therein without departing from the spirit and scope of the invention as defined by the claims.

We claims:

1. A method of controlling an air-conditioning system of the type having a system operator, a building management system, a heat exchanger coil with a coolant fluid flowing therethrough, and a flow of air being circulated therethrough, comprising:
    determining if the system is in a cooling mode;
    determining a supply air temperature;
    establishing a low supply side component temperature limit;
    comparing said supply air temperature with said low supply side component temperature limit;
    responsively raising the supply side coolant fluid temperature;
    obtaining a coolant fluid supply temperature of a supply coolant fluid entering said coil;
    obtaining a coolant fluid return temperature of a return coolant fluid exiting said coil;
    comparing said coolant fluid supply temperature with said coolant fluid return temperature to obtain a coolant fluid delta temperature; establishing a coolant fluid delta temperature setpoint;
    comparing said coolant fluid delta temperature with said coolant fluid delta temperature setpoint to obtain a coolant fluid delta temperature error;
    providing at least one valve for controlling the flow of coolant fluid through said coil;
    and actuating said valve in response to said coolant fluid delta temperature error.

2. The method of claim 1 further comprising: obtaining an air-conditioned zone air temperature;
    obtaining an air-conditioned zone temperature setpoint; comparing said zone air temperature with said zone temperature setpoint to obtain a zone setpoint error value; actuating said valve in response to said zone setpoint error value.

3. The method of claim 1 further comprising: determining if the system is in a heating mode;
    determining said supply air temperature; determining a return air temperature; comparing said supply air temperature with said return air temperature to obtain an air temperature error point; establishing an upper cold shower limit setpoint; comparing said air temperature error point with said upper cold shower limit setpoint; responsively raising the supply side coolant fluid temperature command; and responsively reducing the speed of at least one of a supply air fan.

4. The method of claim 1 further comprising: obtaining said air temperature error point;
    establishing a component failure setpoint; comparing said air temperature error point with said component failure setpoint; and responsively alerting at least one of a system user and a building management system of a component failure.

5. The method of claim 1 further comprising: obtaining said air temperature error point;
    establishing a supply component overheating setpoint; comparing said air temperature error point with said component overheating setpoint; and responsively shutting down said air-conditioning system.

6. A control system apparatus for an air-conditioning system of the type having a zone controller, a heat exchanger coil with a coolant fluid flowing therethrough controlled by a coolant fluid control valve, and a flow of air being circulated therethrough, comprising:
    a coolant fluid supply temperature sensor for sending a representative signal to the zone controller;
    a coolant fluid return temperature sensor for sending a representative signal to the zone controller; wherein the zone controller is capable of developing a coolant fluid delta temperature in response to said representative coolant fluid supply temperature and said coolant fluid return temperature representative signals and comparing said coolant fluid delta temperature against a delta temperature setpoint to generate a coolant fluid delta temperature error signal; and
    a valve actuator that operates in response to said coolant fluid delta temperature error signal to actuate said coolant fluid flow control valve; and a supply air temperature sensor for sending a representative signal to the zone controller;

wherein said air-conditioned zone controller is capable of developing an air delta temperature signal in response to said zone air temperature representative signal and said return air temperature representative signal and comparing said air delta temperature signal with a system component failure parameter to generate a system component status signal;

and responsively communicates said system component failure to a system operator.

7. The control system apparatus of claim 6 and further including:

a zone air temperature sensor for sending a representative signal to the zone controller; and a zone temperature user interface setpoint setting device capable of communicating a zone temperature setpoint to said air-conditioned zone controller;

wherein the zone controller is capable of developing a zone setpoint error point signal in response to said zone air temperature signal and said zone temperature setpoint; and wherein said valve actuator operates in further response to said setpoint error point signal to actuate said fluid flow control valve.

8. The control system apparatus of claim 7 wherein: said zone air temperature sensor is a thermostatic device located within the zone that is capable of sending a representative signal to said air-conditioned zone controller.

9. The control system apparatus of claim 7 wherein: said zone air temperature sensor is a return air sensor that is capable of sending a representative signal to said air-conditioned zone controller.

10. The controls system apparatus of claim 7 wherein: said zone user interface is a thermostatic device operated manually by a system user that is capable of sending a representative signal to the zone controller.

11. The control system apparatus of claim 7 wherein: said zone user interface is a building management system that is capable of sending a representative signal to said air-conditioned zone controller.

12. The control system apparatus of claim 6 wherein: said representative signal is compared with a hazardous equipment failure signal to generate a hazardous equipment condition status signal; and responsively communicates said hazardous status to the system operator.

13. The control system apparatus of claim 6 wherein: said air-conditioned zone controller is a microprocessor based device capable of receiving said representative signals from said sensors and providing operating signals to said valve actuators, cooling fans, component failure devices, and hazardous equipment status alert devices.

* * * * *